(12) United States Patent
Alexejenko et al.

(10) Patent No.: US 10,731,980 B2
(45) Date of Patent: Aug. 4, 2020

(54) STRESS MONITORING DURING THE OPERATION OF A COMPONENT

(71) Applicant: SIEMENS MOBILITY GMBH, Munich (DE)

(72) Inventors: Alexander Alexejenko, Stegaurach (DE); Steffen Rogge, Effeltrich (DE); Kai Markko Wermke, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 243 days.

(21) Appl. No.: 15/501,879

(22) PCT Filed: Jul. 31, 2015

(86) PCT No.: PCT/EP2015/067655
§ 371 (c)(1),
(2) Date: Feb. 6, 2017

(87) PCT Pub. No.: WO2016/020281
PCT Pub. Date: Feb. 11, 2016

(65) Prior Publication Data
US 2017/0241779 A1 Aug. 24, 2017

(30) Foreign Application Priority Data
Aug. 6, 2014 (DE) .......................... 10 2014 215 575

(51) Int. Cl.
*G01B 21/32* (2006.01)
*B60T 17/22* (2006.01)
(Continued)

(52) U.S. Cl.
CPC ............ *G01B 21/32* (2013.01); *B60T 17/228* (2013.01); *F16D 66/00* (2013.01); *G01D 1/00* (2013.01);
(Continued)

(58) Field of Classification Search
CPC .... G01B 21/32; G01M 17/08; G01M 99/007; F16D 66/00; B60T 17/228; G01D 1/00; G01D 21/00
See application file for complete search history.

(56) References Cited

U.S. PATENT DOCUMENTS 6,655,502 B2   12/2003  Sokoll et al.
6,847,869 B2 *  1/2005  Dewberry ............. B60T 17/228
                                                             188/1.11 R
(Continued)

FOREIGN PATENT DOCUMENTS

CN      102928248 A    2/2013
CN      103088849 A    5/2013
(Continued)

*Primary Examiner* — Leslie J Evanisko
*Assistant Examiner* — Leo T Hinze
(74) *Attorney, Agent, or Firm* — Laurence Greenberg; Werner Stemer; Ralph Locher

(57) ABSTRACT

A method for determining operating stress on a component during operation includes recording measured values for predefined measurement variables not equal to the operating stress on the component to be determined, during operation of the component for at least n≥2 predefined different operating modes, determining m≥2 and m≤n effect operands $W_1$ to $W_m$, in dependence on the measured values for each operating mode, recording a measured value of operating stress after operating the component for n operating modes, and setting up and solving an equation system having n equations to obtain m weighting factors $a_1$ to $a_m$ weighting the m effect operands. A sum of weighted effect operands for each operating mode is equal to the measured value of the operating stress recorded for the operating mode. A calculation rule determining the operating stress during operation of the component uses the weighting factors.

7 Claims, 2 Drawing Sheets

(51) Int. Cl.
  *G01D 1/00* (2006.01)
  *F16D 66/00* (2006.01)
  *G01M 5/00* (2006.01)
  *G01M 17/08* (2006.01)
  *G01D 21/00* (2006.01)

(52) U.S. Cl.
  CPC .......... *G01M 5/0033* (2013.01); *G01M 17/08* (2013.01); *G01D 21/00* (2013.01)

(56) References Cited

U.S. PATENT DOCUMENTS

| | | |
|---|---|---|
| 2003/0056995 A1 | 3/2003 | Johnson |
| 2014/0174316 A1 | 6/2014 | Brown et al. |
| 2015/0247781 A1 | 9/2015 | Fischer et al. |

FOREIGN PATENT DOCUMENTS

| | | |
|---|---|---|
| DE | 4214181 A1 | 11/1993 |
| DE | 4316993 C2 | 8/1995 |
| DE | 10029238 A1 | 12/2001 |
| DE | 102007041235 A1 | 3/2009 |
| DE | 102009016664 A1 | 10/2010 |
| DE | 102012005068 A1 | 9/2013 |
| DE | 102013201494 A1 | 3/2014 |
| GB | 2266568 A | 11/1993 |
| JP | H09304131 A | 11/1997 |
| RU | 2518407 C1 | 6/2014 |

* cited by examiner

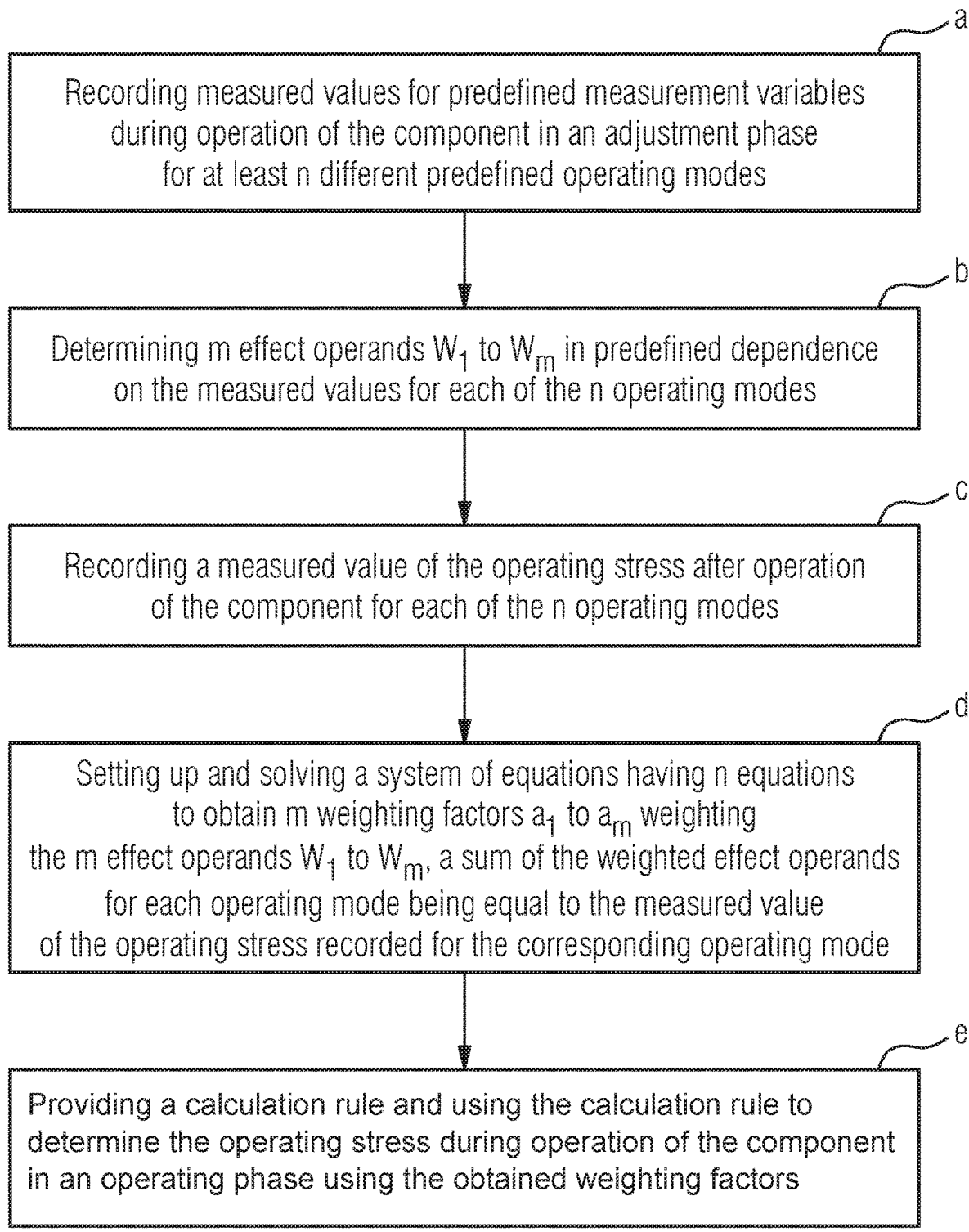

STRESS MONITORING DURING THE OPERATION OF A COMPONENT

BACKGROUND OF THE INVENTION

Field of the Invention

The invention relates to a method for determining an operating stress of a component during operation of the component and a rail vehicle for executing the method.

For many components, in particular for components of a vehicle, it is not possible to directly record an operating stress. An indirect estimate of the operating stress is additionally rendered difficult due to complex, frequently non-linear influencing factors. For such components the operating stresses are recorded during scheduled inspections.

Thus, for example, the recording of operating stresses of brake discs and brake pads or linings of a rail vehicle takes place during maintenance work in a prescribed, regular maintenance interval. Further recordings can be made after a particular event such as, for example, an emergency braking from a high speed since a visual inspection to check for cracks or deformations of the brake could have become necessary. On the other hand, in the case of a little-stressed brake, a regular inspection of the brake could be dispensed with or the maintenance interval could be adapted accordingly.

SUMMARY OF THE INVENTION

It is the object of the invention to provide a method to record operating stresses of a component during operation of the component.

The object is solved by the subject matter of the independent claims. Further developments and embodiments of the invention are found in the features of the dependent patent claims.

A method according to the invention for determining an operating stress of a component, in particular a component of a vehicle, during operation of the component comprises the following process steps:

a. Recording measured values for predefined measurement variables during operation of the component for at least n different predefined operating modes, wherein n≥2, wherein the predefined measurement variables are not equal to the operating stress of the component to be determined;
b. Determining m effect operands $W_1$ to $W_m$ in predefined dependence on the measured values for each of the n operating modes, wherein it holds that: 2≤m≤n;
c. Recording in each case a measured value of the operating stress after operation of the component for each of the n predefined operating modes, wherein it holds that: n≥2;
d. Setting up and solving a system of equations with n equations, in such a manner that m weighting factors $a_1$ to $a_m$ are obtained, with which the n effect operands $W_1$ to $W_m$ are weighted, wherein a sum of the weighted effect operands for each of the n operating modes is equal to the measured value of the operating stress recorded for the corresponding operating mode, wherein it holds that: n≥m≥2;
e. Providing a calculation rule for determining the operating stress during operation of the component using the weighting factors obtained; m and n are natural numbers.

Process step a is executed in particular during an adjustment phase whereas on the other hand, the calculation rule according to process step e for determining the operating stress of the component during operation of the component is provided during an operating phase. This means that the measured values for the predefined measurement variables during operation of the component are recorded during an adjustment phase for the at least n different operating modes. The calculation rule is provided in order to determine the operating stress during a subsequent operating phase without recording it directly and immediately, in particular by measurement.

The component is in particular a component of a vehicle, in particular a rail vehicle. Vehicles are used to transport persons and/or goods. In addition to land vehicles, watercraft, aircraft and spacecraft, as well as mixed forms thereof are also covered.

The operating stress of the component comprises wear of the component. If wear is determined as operating stress, the component could also be designated as a wear part. A progressing loss of mass of a body, in particular at its surfaces, which is usually brought about by mechanical causes, is designated as wear. Wear is occasionally also called abrasion. Wear is one of the main reasons for component damage and the associated failure of machines and equipment. Wear parts are replaceable components which are subjected to a certain wear when used as intended.

The operating stress of a component can in principle be measured. Frequently however not during operation of the component. The operating stress is therefore to be specified by a measurement variable.

In process step a, measured values for measurement variables are recorded which have a direct or indirect influence on the operating stresses. The measurement variables are used to map influencing or wear factors. These influencing factors directly or indirectly influence the operating stress but are not equal to the operating stress. In order to determine, in particular in order to indirectly estimate the operating stress by means of the measured values for the influencing variables which are specified by the measurement variables however, various mathematical operations are optionally required.

Firstly, individual effect operands are predefined to characterize the operating stress. Effect operands need not be directly the subject of a measurement—they are not necessarily measurement variables. They can also be determined by means of physically known or specified mathematical relationships from measurement variables to which direct measurements apply. An effect operand is determined according to the predefined calculation rule from at least one influencing factor. The effect operands are therefore dependent on the said measured values and are determined by means of a predefined calculation rule or mathematical formula.

The effect operands are therefore determined by means of predefined functions and according to a further development of the invention by means of predefined mathematical operations, wherein the measured values recorded in process step a for the predefined measurement variables are used as operands of the mathematical operations. Additional operands can optionally assume constant values which are predefined, in particular depending on the corresponding operating mode. In a further development, exclusively constants and the measured values recorded in process step a are used as operands to determine the effect operands.

If the component for example comprises a brake disk, a brake pad or a brake lining of a brake, in particular a hydraulic or compressed-air operated brake, of a rail vehicle, for example, the braking time and/or the braking distance and/or the brake pressure in a brake cylinder of the brake of the rail vehicle and/or the instantaneous speed of the rail vehicle are measured continuously or discretely with a predefined measurement frequency and therefore measured values for these measurement variables are recorded by means of suitable sensing elements. A first effect operand can then, for example, be determined by forming an integral over the braking distance of the square of the measured values of the brake pressure. For a second effect operand, a product of the brake pressure and the instantaneous speed of the rail vehicle can be integrated over the braking distance. A third effect operand could be obtained from the integration of the brake pressure over the braking distance. In the case of m=3 effect operands, at least n=3 different operating modes must be predefined for which the measured values for the predefined measurement variables are recorded and for which the operating stresses are recorded. A first operating mode then comprises, for example, normal decelerations from predefined speeds on approaching a stop. A second operating mode can on the other hand comprise emergency or rapid decelerations from high speeds. A third operating mode then comprises for example emergency or rapid decelerations from low speeds, such as can occur, for example when persons go onto the tracks at stops shortly before the rail vehicle stops.

However, operating modes can also only be marginally distinguished. Thus, measured values of a first operating mode could be determined over a predefined time interval or a predefined distance, for example from a location B to another location C, during operation of the component as intended with a plurality of moderate decelerations and a few rapid decelerations. The reverse route from location C to location B during operation of the component as intended could serve as second operating mode, even with very similar operating conditions. It is important that the component is operated in separate and different operating modes and the measured values are recorded and then evaluated. The operating modes can also merely differ from one another by different environmental conditions as long as the environmental conditions are also recorded in the measured values and used to determine the effect operands. Thus, for example, the influence of climatic conditions could be taken into account. Then for example temperature or air humidity are recorded as measured values. The determination of the effect operands is made as above in predefined, in particular fixed dependence on the measured values recorded over the predefined time, for example, over the elapsed time duration of the operation of the component as intended in the corresponding operating mode. According to one exemplary embodiment, the determination of the effect operands is made exclusively by means of the recorded measured values and constants and mathematical operations.

For setting up the system of equations from process step d, the effect operands are then weighted with weighting factors wherein each effect operand is multiplied with a weighting factor. Thus, the number of weighting factors is equal to the number of effect operands. This takes place separately for each operating mode. The sum of the weighted effect operands is then equated for each operating mode to the measured value for the operating stress recorded for the corresponding operating mode. In the case of n operating modes, n equations are thus obtained.

If the operating stress recorded directly for each operating mode is designated by z, the system of equations can be represented as follows:

$$a_1*W_{11}+a_2*W_{12}+\ldots+a_n*W_{1m}=z_1$$

$$a_1*W_{21}+a_2*W_{22}+\ldots+a_n*W_{2m}=z_2$$

$$a_1*W_{n1}+a_2*W_{n2}+\ldots+a_n*W_{nm}=z_n$$

The system of equations is then solved and the values for the weighting factors $a_1$ to $a_m$ are obtained. When solving the system of equations, it can certainly occur that one weighting factor becomes zero. Usually the weighting factors $a_1$ to $a_m$ assume values from the set of real numbers, for example, positive rational numbers.

The system of equations from process step d is solved in a further development by means of equivalence transformations. These are considered to be widely known.

Both the calculation rule for determining the operating stress and also the calculation rule for the effect operands and the determined values for the weighting factors are stored in a memory in order to provide these for a subsequent evaluation during the operating phase.

According to another further development of the invention, process step e is followed by the following process steps:

f. Recording measured values for the predefined measurement variables during operation of the component, which measurement variables are not equal to the operating stress of the component to be determined;
g. Determining the effect operands $W_1$ to $W_m$ in predefined dependence on the measured values;
h. Determining the operating stress of the component during operation of the component by means of the provided calculation rule with the weighting factors obtained.

Process step f is executed during the operating phase which follows the adjustment phase. The predefined measurement variables from process steps a and f are identical.

The adjustment phase can be executed with one or more identical components whereas in the operating phase further components identical to the components of the adjustment phase are used. The determined calculation rule including weighting factors therefore applies not only for an individual component but for all components of a group of identical components. Thus, before process step f, the component can be exchanged with a component from a common group of identical components. In the above-mentioned example, in the adjustment phase process steps a to e are carried out, for example, with a first brake lining. The first brake lining is then replaced by a second brake lining, which is different from the first brake lining but taken from a common group of identically formed brake linings, with which process steps f to h are executed.

According to a further development, the operating stress of the component determined in process step h during operation of the component can be output. For example, it can be displayed to a vehicle driver or it is transmitted to a central control center and displayed there for further processing and evaluation. The determined operating stress can also be output depending on the determined operating stress. If it exceeds a predetermined threshold value, it is displayed and/or an alarm signal is optionally output. Below the threshold value no output of the determined operating stress and/or optionally of an alarm signal takes place. The operating stress can be determined during operation of the component during the operating phase continuously or discretely in predefined time intervals. A determination can also be made depending on predefined events, for example, after emergency brakings from high speeds.

According to one embodiment of the invention, in process step a measured values for k predefined measurement variables can be recorded during operation of the component, where k is a natural number greater than or equal to m and it therefore holds that: k≥m. Alternatively a larger number of effect operands could also be formed from a smaller number of measurement variables. Then it would hold that k≥m.

A rail vehicle according to the invention for executing the method according to the invention comprises at least one sensing element for recording the measured values for the predefined measurement variables, at least one memory for receiving and outputting the weighting factors and at least one evaluation unit, in particular a microcontroller for determining the operating stress of the component during operation of the component by means of the provided calculation rule. The at least one sensing element is suitable for recording measured values for the predefined measurement variables and is configured accordingly.

Furthermore, the invention provides a computer program product for executing the method according to the invention. The computer program product comprises a software code which is suitably configured to execute the method according to the invention when it is executed on a suitable data processing system which in particular is covered by the rail vehicle according to the invention. Furthermore, the object forming the basis of the invention is solved by a computer-readable data carrier on which the computer program product according to the invention is stored. The computer-readable data carrier can also be covered by the rail vehicle in this case, in particular it is covered by the memory for receiving and outputting the weighting factors of the vehicle.

BRIEF DESCRIPTION OF THE SEVERAL VIEWS OF THE DRAWING

FIG. 2 shows a flow diagram.

DESCRIPTION OF THE INVENTION

Figure 1:
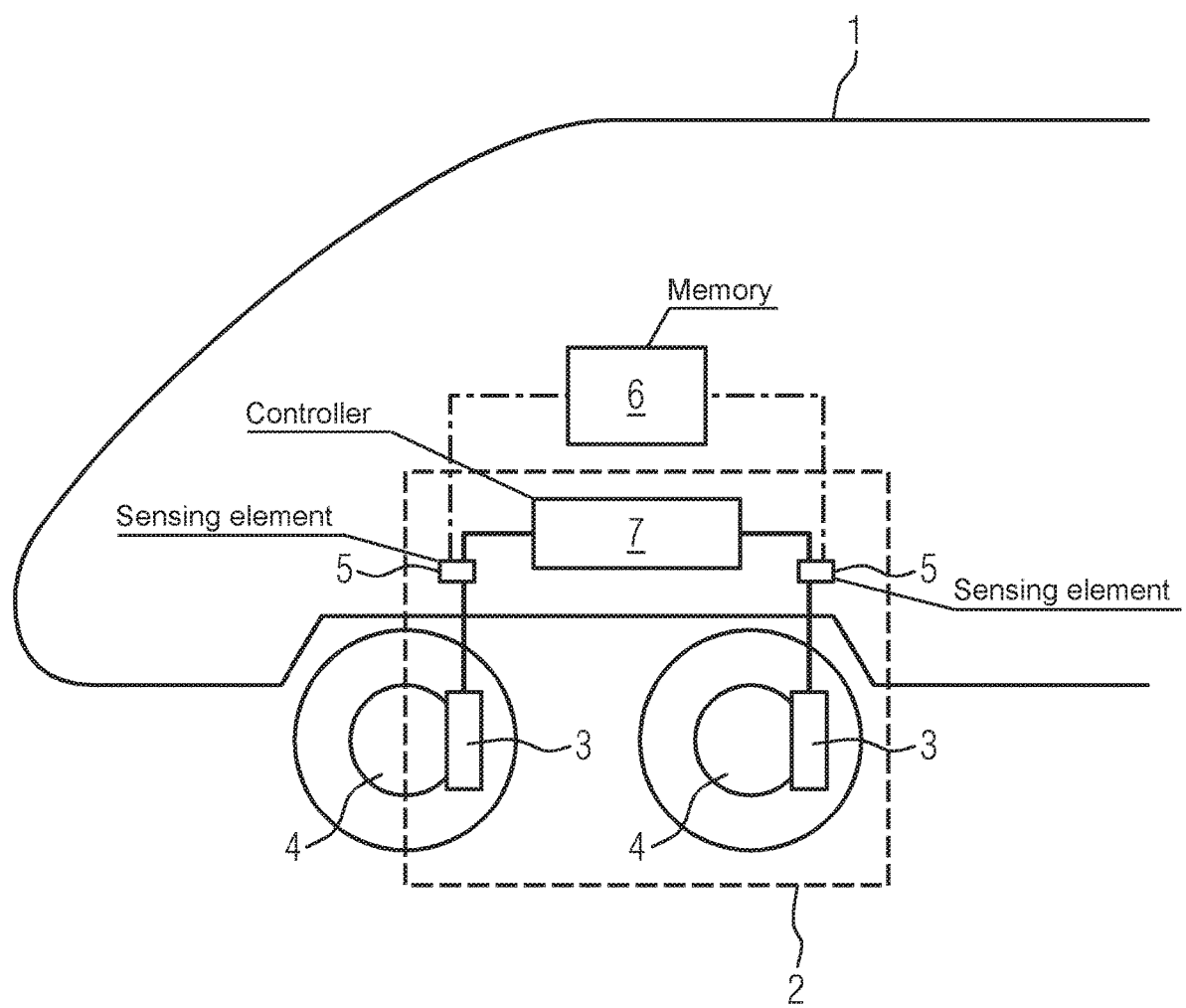
FIG. 1 shows a rail vehicle.

The invention allows numerous embodiments. It will be explained in more detail with reference to the following example but should not be considered to be restricted to this.

A manufacturer of rail vehicles manufactures a first one of a fleet of identically constructed rail vehicles. It comprises a compressed-air-operated braking system. After completion, it is subjected to various test runs on a test section.

In this case, it is operated in various operating modes. In an adjustment phase in order to determine an operating stress of a brake lining, measured values for predefined measurement variables are initially recorded for each operating mode. The measurement variables are in this case not equal to the operating stress of the brake lining to be determined. The reduction in the thickness of the brake lining after each operation of the rail vehicle in the predefined operating modes is recorded here as the operating stress of the brake lining. Further examples for operating stresses can be: the abrasion or the groove depth of a brake disk, but also the instantaneous operating temperature of the brake disk. On the other hand, for example, the instantaneous vehicle speed, the braking distance or the time as well as the instantaneous pressure in a brake cylinder are predefined as measurement variables during operation.

Firstly, the vehicle is operated during the adjustment phase therefore in a predefined first operating mode, during operation the measured values for the predefined influencing factors are recorded and after operation the operating stress is measured. During the adjustment phase the vehicle is then operated in another predefined second operating mode different from the first operating mode, during operation the measured values for the predefined influencing factors are recorded and after operation the operating stress is measured.

After operating the vehicle in three different operating modes, three measured values are now provided for the reduction in the thickness of the brake lining as well as a plurality of measured values for the instantaneous vehicle speed v and for the instantaneous brake cylinder pressure p for each operating mode. The instantaneous vehicle speed v and the instantaneous brake cylinder pressure p are in this case functions of the braking distance s (p=p(s) and p=p(s)) or the time t (p=p(t) and p=p(t)).

Also in this case at most three effect operands are determined in predefined dependence on the measured values for the instantaneous vehicle speed v and for the instantaneous brake cylinder pressure p for each of the three operating modes. Here the effect operands are obtained as:

$$W_1 = \int_0^s p^2 ds;$$

$$W_s = \int_0^s (v \cdot p) ds;$$

$$W_3 = \int_0^s p \, ds.$$

Now an equation to calculate the operating stress for each operating mode can be set up. To this end the respective effect operands $W_1$ to $W_3$ are weighted with weighting factors $a_1$ to $a_3$ for each of the three operating modes in such a manner that the decrease in the thickness of the brake lining recorded directly for each operating mode is equal to a sum of the weighted effect operands. The decrease in the thickness of the brake lining is hereinafter designated by z. In general therefore for each operating mode it should hold that:

$$z = a_1 * W_1 + a_2 * W_2 + a_2 * W_2.$$

As already explained above, for n operating modes accordingly a system of equations is generally obtained:

$$a_1 * W_{11} + a_2 * W_{12} + \ldots + a_n * W_{1m} = z_1$$

$$a_1 * W_{21} + a_2 * W_{22} + \ldots + a_n * W_{2m} = z_2$$

$$a_1 * W_{n1} + a_2 * W_{n2} + \ldots + a_n * W_{nm} = z_n$$

and in the present case:

$$z_1 = a_1 \cdot \int_0^{s_1} p_1^2 ds_1 + a_2 \cdot \int_0^{s_1} (v_1 \cdot p_1) ds_1 + a_3 \cdot \int_0^{s_1} p_1 ds_1$$

$$z_2 = a_1 \cdot \int_0^{s_2} p_2^2 ds_2 + a_2 \cdot \int_0^{s_2} (v_2 \cdot p_2) ds_2 + a_3 \cdot \int_0^{s_2} p_2 ds_2$$

$$z_3 = a_1 \cdot \int_0^{s_3} p_3^2 ds_3 + a_2 \cdot \int_0^{s_3} (v_3 \cdot p_3) ds_3 + a_3 \cdot \int_0^{s_3} p_3 ds_3.$$

Here the three different operating modes were also taken into account in the subscripts. The first operating mode here provided a braking with a predefined small jolt and a predefined mean braking acceleration from a mean predefined speed to a standstill. The braking required the braking distance $s_1$. This resulted in a decrease in the thickness of the brake disk $z_1$. The second operating mode here provided a braking with a predefined large jolt and a predefined large braking acceleration from a high predefined speed to a standstill. The braking required the braking distance $s_2$ and resulted in a decrease in the thickness of the brake disk of $z_2$. The third operating mode here on the other hand provided a braking with a predefined large jolt and a predefined large braking acceleration from a low predefined speed to a standstill which required a braking distance $s_3$ and resulted in a decrease in the thickness of the brake disk of $z_3$. The instantaneous speed for the braking of the first operating mode was designated by $v_1$. The instantaneous pressure in the brake cylinder for the braking of the first operating mode was designated by $p_1$. Similarly the instantaneous speeds and the instantaneous brake pressures for the braking of the second and third operating mode are designated by $v_2$ or $v_3$ and $p_2$ or $p_3$ respectively.

However, an operating mode can also comprise a plurality of identical decelerations. The vehicle is then accelerated multiple times to the predefined speed and decelerated in a predefined manner. The operating stress, here therefore the decrease in the thickness of the brake lining, is only measured thereafter. A higher significance is advantageous. If x were the number of successively executed decelerations per operating mode, where x is a natural number greater than one, without further adaptation of the subscripts the equations of the system of equations would appear as follows:

$$Z_n = a_n \cdot \sum_{i=1}^{x} \int_0^{s_n} p_n^2 ds_n + a_n \cdot \sum_{i=1}^{x} \int_0^{s_n} (v_n \cdot p_n) ds_n + a_n \cdot \sum_{i=1}^{x} \int_0^{s_n} p_n ds_n.$$

In order to determine the weighting factors, the system of equations set up above is now solved so that values for the weighting factors $a_1$ to $a_3$ are obtained.

The values for the weighting factors as well as the said calculation rules are then stored in a computer-readable data carrier of each rail vehicle of the fleet of structurally identical rail vehicles of the manufacturer. After delivery of the rail vehicles to the customer, these are put into operation. The operating phase of a rail vehicle comprises the now-following runs in regular operation of the customer including the operation of the brakes as intended.

The rail vehicles are each fitted with different but structurally identical brakes. Nevertheless, the operating stress can be determined with the stored data and with the measured values for the predefined measurement variables recorded during operation in the operating phase. A replacement of the brake linings with structurally identical brake linings is also irrelevant.

In the operating phase of one of the vehicles following the adjustment phase, measured values for the predefined measurement variables are firstly recorded during operation of the component, which measurement variables are not equal to the operating stress of the component to be determined. The effect operands $W_1$ to $W_m$ are then determined in predefined dependence on the measured values and the operating stress of the component during operation of the component is determined by means of the provided calculation rule using the weighting factors obtained. To this end the calculation rules and the weighting factors are read out from the memory or the computer-readable data carrier for further processing and processed in the evaluation unit.

Advantages of the invention are in particular that the operating stress of the component during operation of the component in an operating phase can be estimated indirectly by the method according to the invention without directly recording this, specifically when a measurement of the operating stress during operation is not possible, the operating stress therefore cannot be recorded directly. Measurements of the abrasion or influencing factors as predefined measurement variables during operation of the component are sufficient for this. A model of the operating stress forms the basis thereof. During operation of the component in the operating phase, the method according to the invention is therefore free from a direct recording of the operating stress. The model maps the influence of individual effect operands on the operating stress in various operating modes. In order to determine the parameters, it is merely necessary to run through at least two different operating modes in an adjustment phase and distinguish the measured values for the predefined measurement variables and evaluate according to the model. The model is described mathematically by the predefined calculation rule. This is made possible by the separation of the adjustment phase from the operating phase. In the adjustment phase the model is created and stored, in the operating phase this model is then used.

A signal, for example, an alarm can be output when a predefined limiting value for the operating stress is exceeded and the vehicle driver can thus be warned in good time of any failure of the component. Instead of the output of a signal, the determined operating stress can also be further processed, for example, for planning inspections or even for adaptation of the inspection intervals. Furthermore, it is possible to estimate the lifetime of the component still to be expected and to implement a quasi-continuous stress monitoring over the lifetime of the component.

The influence of environmental conditions, for example, climate can also be taken into account by means of the empirical determination of the weighting factors of the calculation rule. Since the component can be operated as intended under different environmental conditions, measured values for external conditions such as, for example, for air temperature or air humidity of the surroundings of the component can also be recorded and the effect operands can be determined accordingly also in dependence on the recorded measured values for the environmental conditions.

The determined calculation rule is valid for components from a group of structurally identical components in structurally identical vehicles and can be expanded to generic vehicles. Thus, only an adjustment phase is required. This is primarily advantageous for operating stresses which can only be recorded very expensively. The operation of the component in different operating modes during the adjustment phase itself also need not be carried out with the same component but merely with a component from a group of structurally identical components from which the component from the operating phase then originates.

Optimal operating modes for the component can also be determined with the method according to the invention. To this end the method comprises a corresponding process step following process step e.

The different operating stress of components of different manufacturers can thus also be easily determined.

Since the operating modes can also only differ marginally, for example, in distance, time duration or environmental conditions, no particular operating conditions need be simulated during the adjustment phase, in particular no special run programs need be executed. It is sufficient to monitor the corresponding measured values during usual maintenance trips.

FIG. 1 shows a rail vehicle 1 including a compressed air brake 2 with a brake cylinder 3, a brake lining 4, a sensing element 5 for recording a brake pressure and a non-transitory computer memory 6 for receiving and storing the measuring data. FIG. 1 also shows a controller 7 for controlling the brakes. FIG. 2 shows a flow diagram illustrating basic steps of the method for determining an operating stress of a component during operation of the component comprises. The method includes at least the following steps: Recording measured values for predefined measurement variables during operation of the component in an adjustment phase for at least n different predefined operating modes (step a). In step a), n≥2 and the measurement variables are not equal to the operating stress of the component. Determining m effect operands $W_1$ to $W_m$ in predefined dependence on the measured values for each of the n operating modes (step b). In step b, m≥2 and m≤n. Recording a measured value of the operating stress after operation of the component for each of the n operating modes (step c). Setting up and solving a system of equations having n equations to obtain m weighting factors $a_1$ to $a_m$ weighting the m effect operands $W_1$ to $W_m$ (step d). In step d, a sum of the weighted effect operands for each operating mode is equal to the measured value of the operating stress recorded for the corresponding operating mode. Providing a calculation rule and using the calculation rule to determine the operating stress during operation of the component in an operating phase using the obtained weighting factors (step e).

The invention claimed is:

1. A method for determining an operating stress of a component during operation of the component comprises the following steps:
   a. recording measured values for predefined measurement variables during operation of the component in an adjustment phase for at least n different predefined operating modes, where n≥2, the measurement variables not being equal to the operating stress of the component to be determined;
   b. determining m effect operands $W_1$ to $W_m$ in predefined dependence on the measured values for each of the n operating modes, where m≥2 and m≤n;
   c. recording, during the adjustment phase, a measured value of the operating stress after operation of the component for each of the n operating modes;
   d. setting up and solving a system of equations having n equations to obtain m weighting factors $a_1$ to $a_m$ weighting the m effect operands $W_1$ to $W_m$, a sum of the weighted effect operands for each operating mode being equal to the measured value of the operating stress recorded for the corresponding operating mode; and
   e. providing a calculation rule to an evaluation unit and in the evaluation unit, determining the operating stress by using the obtained weighting factors in the calculating rule during operation of the component in an operating phase;
   wherein the n operating modes comprise at least:
   a first operating mode including normal decelerations from predefined speeds on approaching a stop;
   a second operating mode including emergency or rapid decelerations from high speeds; and
   a third operating mode including emergency or rapid decelerations from low speeds;
   wherein the component is a brake lining of a rail vehicle;
   wherein the predefined measurement variables are at least one of time or braking distance or pressure in a brake cylinder of a compressed air brake of the rail vehicle; and
   further comprising obtaining three effect operands including:
   a first effect operand obtained from an integral of the square of the pressure in the brake cylinder of the compressed air brake of the rail vehicle over the braking distance of the rail vehicle,
   a second effect operand obtained from an integral of a multiplication of a speed of the rail vehicle and the pressure in the brake cylinder of the compressed air brake of the rail vehicle over the braking distance of the rail vehicle, and
   a third effect operand obtained from an integral of the pressure in the brake cylinder of the compressed air brake of the rail vehicle over the braking distance of the rail vehicle.

2. The method according to claim 1, which further comprises the following steps following step e:
   f. recording measured values for the predefined measurement variables during operation of the component in the operating phase, the measurement variables not being equal to the operating stress of the component to be determined;
   g. determining the effect operands $W_1$ to $W_m$ in predefined dependence on the measured values; and
   h. determining the operating stress of the component during operation of the component by using the calculation rule with the obtained weighting factors.

3. The method according to claim 2, which further comprises, before step f, exchanging the component with a component from a common group of identical components.

4. The method according to claim 2, which further comprises outputting the operating stress of the component determined in step h during operation of the component.

5. The method according to claim 1, which further comprises solving the system of equations set up in step d by using equivalence transformations.

6. The method according to claim 1, which further comprises determining the effect operands by using mathematical operations exclusively using the recorded measured values for the predefined measurement variables and predefined constants as operands.

7. At least one non-transitory computer-readable medium having a computer program product stored thereon, the computer program product, when executed by a processor, performing the steps of claim 1.

* * * * *